(12) United States Patent
Charlet et al.

(10) Patent No.: US 7,340,164 B2
(45) Date of Patent: Mar. 4, 2008

(54) OPTICAL WDM TRANSMISSION SYSTEM

(75) Inventors: Gabriel Charlet, Villiers le Bacle (FR); Loïc Becouarn, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/475,904

(22) Filed: Jun. 28, 2006

(65) Prior Publication Data
US 2007/0024957 A1    Feb. 1, 2007

(30) Foreign Application Priority Data
Jul. 26, 2005    (EP)    ................... 05291595

(51) Int. Cl.
*H01S 3/00*    (2006.01)
*H04B 10/08*    (2006.01)
(52) U.S. Cl. ....................... 398/30; 359/334
(58) Field of Classification Search ................ 398/30; 359/334
See application file for complete search history.

(56) References Cited
U.S. PATENT DOCUMENTS

| | | | |
|---|---|---|---|
| 5,844,706 A | 12/1998 | Kohn et al. | |
| 6,229,631 B1 * | 5/2001 | Sato et al. | 398/30 |
| 6,359,708 B1 * | 3/2002 | Goel et al. | 398/15 |
| 6,532,102 B2 * | 3/2003 | Kobayashi et al. | 359/334 |
| 6,721,091 B2 | 4/2004 | Foursa et al. | |
| 6,930,823 B2 * | 8/2005 | Nakamoto et al. | 359/334 |
| 7,103,275 B2 * | 9/2006 | Fujiwara | 398/31 |
| 7,146,100 B2 * | 12/2006 | Osaka | 398/30 |

(Continued)

FOREIGN PATENT DOCUMENTS
WO    2004/073215    8/2004

OTHER PUBLICATIONS

FITEL Data Sheet. FSDS-038B. DC202 Series Single Window Tap Coupler. Jun. 2003.*

*Primary Examiner*—Deandra M Hughes
(74) *Attorney, Agent, or Firm*—Sughrue Mion, PLLC

(57) ABSTRACT

An optical wavelength division multiplex transmission system (1) for transmitting optical signals (S) on a plurality of wavelength channels has a transmitting terminal (2) and a receiving terminal (3) interconnected by a transmission line (5) with at least one, preferably a plurality of optical amplifiers (4). Each of the optical amplifiers (4) comprises a Raman amplifier (6) with at least one pump light source (8.1-8.3) for pumping the transmission line (5) upstream the optical amplifier (4). It is proposed that each optical amplifier (4) comprises a single tap coupler (11) arranged downstream of the Raman amplifier (6). Optical receiving and transmitting means (14, 15) may be connected to the transmission line (5) via the tap coupler (11) for communication of data (TX, Di) between at least the transmitting terminal (2) and the optical amplifiers (4) on an optical supervisory channel (OSC) with a given wavelength. Alternatively or in addition, monitoring means (12) for monitoring at least one optical transmission parameter may be connected to the transmission line via the tap coupler (11). It is also possible to couple each optical amplifier (4) by means of its tap coupler (11) to a corresponding optical amplifier (4') of a second substantially identical transmission system (1') for transmitting optical signals (S') in an opposite direction via a transmission line (5') of the second system (1'). The all-Raman optical transmission system thus obtained shows improved performance, in particular with respect to loss, noise, PMD, and PDL, while distinguishing itself from prior art systems by its simplicity and corresponding cost-effectiveness.

12 Claims, 3 Drawing Sheets

U.S. PATENT DOCUMENTS

2002/0048062 A1* 4/2002 Sakamoto et al. .......... 359/124
2002/0122242 A1* 9/2002 Shimojoh ................... 359/334
2003/0072064 A1 4/2003 Ohta
2004/0208519 A1* 10/2004 Feldman et al. .............. 398/30
2005/0024714 A1 2/2005 Hayashi et al.
2005/0041968 A1* 2/2005 Takahashi ................... 398/30
2005/0078351 A1 4/2005 Avallone et al.

* cited by examiner

OPTICAL WDM TRANSMISSION SYSTEM

BACKGROUND OF THE INVENTION

The invention is based on a priority application EP 05291595.6 which is hereby incorporated by reference.

The invention relates to an optical wavelength division multiplex transmission system for transmitting optical signals on a plurality of wavelength channels, having a transmitting terminal and a receiving terminal interconnected by a transmission line with at least one, preferably a plurality of optical amplifiers, each of the optical amplifiers comprising a Raman amplifier with at least one pump light source for pumping the transmission line upstream the optical amplifier.

Current optical transmission systems, in particular submarine systems, are generally based on optical amplifiers in the form of Erbium Doped Fiber Amplifiers (EDFAs) and use a low frequency modulation of the signal power (frequency around 150 KHz) on the transmitting terminal side to check the status of each optical amplifier in the system. The optical amplifiers answer with a low frequency modulation (<100 KHz) of their pump which can be interpreted by the receiving terminal. The amount of information to be exchanged in this way is very low in an EDFA based transmission system. The desired system gain flatness is obtained owing to the design of the amplifier (fiber length, span loss, gain flattening filter). When the system loss increases due to ageing or fiber repairs, a tilt of the system gain profile appears, which can be compensated by means of a link filter.

In the case of long transmission spans between individual EDFAs, these can be supported by Raman amplifiers perfoming distributed Raman amplification on the transmission spans in question. Prior art optical transmission systems of this type are known from the documents U.S. Pat. No. 6,532,102 B2, U.S. Pat. No. 6,721,091 B2, and WO 2004/073215 A1, respectively, each of which discloses an optical transmission system with hybrid Raman/EDFA amplifiers.

In order to increase the flexibility of the amount of data that can be exchanged between the transmitting terminal and the optical amplifiers, solutions based on the use of an optical supervisory channel (OSC) have been realised. Examples of such solutions are disclosed in the above-mentioned documents U.S. Pat. No. 6,532,102 B2 and WO 2004/073215 A1.

However, a common drawback of the prior art EDFA based or hybrid transmission systems is the inevitable use of a plurality of tap couplers for extracting and adding data from/to the optical supervisory channel and for controlling operating parameters of the optical amplifiers, e.g. pump powers of the Raman amplifiers. This entails the use of a plurality of optical multiplexers and de-multiplexers in each optical amplifier along the transmission line, which deteriorate the system performance by introducing additional loss and noise together with increased Polarisation Mode Dispersion (PMD) and Polarisation Dependent Loss (PDL).

SUMMARY OF THE INVENTION

It is the object of the present invention to provide an optical transmission system of the above-mentioned type showing improved performance, in particular with respect to loss, noise, PMD, and PDL, while distinguishing itself from prior art systems by its simplicity of realisation and corresponding cost-effectiveness.

The object is achieved by a transmission system of the above-mentioned type, wherein each optical amplifier comprises a single tap coupler arranged downstream of the Raman amplifier.

The invention provides a cost-effective next generation (submarine or terrestrial) transmission system, making use solely of wide band Raman amplification instead of standard EDFA or hybrid Raman/EDFA, thus obviating the above-mentioned disadvantages. In such a system, it is possible to use only a single tap coupler per optical amplifier for the purposes described above.

In a preferred embodiment each optical amplifier of the transmission system is coupled by means of its tap coupler to a corresponding optical amplifier of a second substantially identical transmission system transmitting optical signals in an opposite direction via a transmission line of the second system. For instance, in the case of a transatlantic transmission line this would be done by linking an East-West cable to the West-East cable through only one tap coupler at each optical amplifier on each line—not two as in prior art EDFA systems, since the signal does not have to be amplified by a discrete (EDFA) amplifier for it has already been amplified by distributed Raman amplification. Usually, an attenuator is added in the coupling connection in order to minimise detrimental interaction between the two cables.

In this way, according to the invention it is still possible to control an optical amplifier by means of a transmitting terminal, i.e. the transmitting terminal of the second system, in case of a failure of the first transmission system. Furthermore, being able to send the command for each amplifier by either terminal significantly improves the system reliability, e.g. in case one of the receiving means (e.g. photodiode) is degraded.

An important point in the context of the present invention is the detection and localisation of a cable cut. In the embodiment described above, a cable cut in the transmission system can be localized by sending an intense optical pulse from the transmission terminal across the transmission line, which is reflected at the position of the cable cut (Rayleigh scattering). The reflected signal is transmitted via the tap to the second transmission system and may then be detected at the receiving terminal of the latter.

According to a preferred embodiment, each optical amplifier comprises monitoring means for monitoring at least one transmission parameter, e.g. an output power of the amplifier and/or a spectrum of the transmitted signals, the monitoring means being connected to the transmission line by means of the single tap coupler. The monitored transmission parameter, preferably the power spectrum, may be used e.g. as an input to a controlling means for controlling an output power of the optical amplifier.

According to a preferred embodiment of the inventive transmission system, each optical amplifier comprises control means in operative connection at least with the optical receiving means for controlling at least one operation parameter of the Raman amplifier, e.g. a pump power. Used in combination with the monitoring means, the pump power can be controlled by the amplifier itself. For instance, each amplifier can adjust its own pump(s) in order to achieve a flat spectrum. The shape of the spectrum usually evolves during the life time of the transmission system due to ageing of the line, fiber repairs, or pump failure: In a (submarine) wide band all-Raman transmission system, as provided by the invention, a variation of fiber loss due to ageing leads to a large gain (and tilt) variation which has to be compensated by Raman pump power re-optimisation. Furthermore, whenever the input power in front of an amplifier drops due to fiber repair, corresponding gain and tilt variations also occur.

In a highly preferred embodiment each optical amplifier comprises optical receiving and transmitting means connected to the transmission line by means of the single tap coupler for communication of data between at least the transmitting terminal and the optical amplifiers on an optical supervisory channel with a given wavelength. In this way, the corresponding control decision for adjusting the amplifier pump(s) can be taken by the transmitting terminal. For example, if the span loss increases by several dB in one span due to repair work (10 km fiber or more can be added), the output power of the corresponding amplifier, i.e. upstream the added fiber, prior to the failure can be increased by half the added span loss. Of course, it is also possible to combine the information about the transmission parameter derived from the measuring means and the communication data received from the transmitting terminal on the optical supervisory channel (OSC) for adjusting pump power of the Raman amplifiers.

In order to further improve the reliability of the inventive transmission system, the latter can again be coupled to a second substantially identical transmission system for transmitting optical signals in an opposite direction, such that the two transmission systems have a single shared optical supervisory channel transmitting and the transmitting means can be arranged for transmitting optical supervisory channel communication data simultaneously in both directions, i.e. it can be decided to set up a configuration, in which the same information is sent into both directions by one single laser. Furthermore, at least one substitution transmitting means could be provided to replace the shared transmitting means if a failure occurs during the system life time.

In a preferred development a bit rate in the optical supervisory channel is lower than a bit rate on any one of the other wavelength channels (at 10 Gb/s or above). Consequently, the supervisory channel power can equally be lower, thus adding to the cost-effectiveness of the inventive transmission system.

In a further preferred development the optical supervisory channel is located in the amplification bandwidth of the optical amplifiers, preferably in the middle or at an extremity thereof. The amplification bandwidth may coincide with the transmission bandwidth of the transmission line fiber. The important point is that the OSC laser wavelength is located within the amplification bandwidth of the line-amplifier contrary to terrestrial systems where the OSC can be located at 1510 nm, i.e. apart of the amplifier bandwidth, and then has to be dropped and then added at each amplifier site. For instance, the optical supervisory channel could be located at a wavelength $\lambda_{osc} \approx 1565$ nm for an amplification bandwidth ranging from about 1530 nm to about 1605 nm. In this context, the optical transmitting means advantageously comprise a directly modulated laser operating at the wavelength of the optical supervisory channel, e.g. $\lambda=1565$ nm.

In another development the optical receiving means comprise filter means for removing the transmission channels and selecting the optical supervisory channel as well as a light sensitive receiving element, e.g. a photodiode, arranged behind the filter means. Furthermore, the optical supervisory channel is preferably arranged for timeshared communication of data, the transmitting terminal being arranged for transmitting data during a time $t_0$ and the optical amplifiers being arranged for transmitting data during subsequent times $t_{1i}$, i=1, ..., n, specific to the individual amplifiers, where it is an optical amplifier index incremented in the direction of signal transmission and n is the total number of optical amplifiers in the transmission system, with $t_0+\Sigma_i t_{1i}<T$, where T is a period of the timeshared communication. Thus, during the time $t_0$, first the terminal sends some communication data, e.g. intended to adjust the pump power of a given optical amplifier in the system after a fiber repair. Then each amplifier can answer or send its own information (pump powers, spectrum shape, etc.) on the OSC by means of its transmitting means, e.g. a laser located in the amplifier, which may be devised as a directly modulated laser (cf. above). In this way each amplifier can read all the information written by the transmitting terminal and the previous amplifiers, i.e. the amplifiers upstream with respect to a transmission direction of the inventive system. Also, the standard repeater interrogation by the terminal could be done in this way as well as the time sharing proposal.

Alternatively or additionally, an optical supervisory channel input signal at a given optical amplifier can comprise at least one datum originating from the transmitting terminal followed by data originating from any one of the optical amplifiers located upstream the given optical amplifier, and an optical supervisory channel output signal at a given optical amplifier can comprise at least one datum originating from the transmitting terminal followed by data originating from any one of the optical amplifiers located upstream the given optical amplifier and a datum originating from the given optical amplifier. Accordingly, as time is shared between the individual amplifiers when they write their own data information on the OSC, no specific optical components such as an optical demultiplexer or the like have to be inserted in the transmission link, thus avoiding potential degradation of high bit-rate channel traffic by adding PMD and/or PDL. As stated above, preferably only one filter means is inserted in front of the photodiode or an equivalent light sensitive receiving element of the receiving means in order to remove the traffic channels and to select the optical supervisory channel.

Further advantages and characteristics of the present invention can be gathered from the following description of preferred embodiments with reference to the enclosed drawings. The features mentioned above as well as below can be used in accordance with the invention either individually or in conjunction. The embodiments mentioned are not to be understood as an exhaustive enumeration but rather as examples with regard to the underlying concept of the present invention.

BRIEF DESCRIPTION OF THE DRAWINGS

FIG. 1 shows a first embodiment of the optical transmission system 1 according to the invention. The system 1 depicted above the dash-dotted line comprises two end terminals, i.e. a transmitting terminal 2 and a receiving terminal 3, and a series of optical amplifiers 4 arranged in cascade connection between the end terminals 2, 3. Only one of the amplifiers 4 is depicted for simplicity. The end terminals 2, 3 as well as the optical amplifiers 4 are interconnected in series by means of an optical fiber transmission line 5, thus forming the optical transmission system 1 for transmitting optical signals S in the direction of the arrow on a plurality of wavelength channels in wavelength division multiplex. The optical amplifiers 4 each include a Raman amplifier 6 comprising a multiplexer 7 in operative connection with a plurality of Raman pumps 8.1, 8.2, 8.3 for injecting Raman pump light into the transmission line 5, followed by an isolator 9 and a Gain Flattening Filter 10. A tap coupler 11 is inserted after the Raman amplifier 6. The tap coupler 11 can be used to measure the output power of the amplifier 6 as well as the transmission spectrum by means of a monitoring means 12 in the form of an Optical Performance Monitor (OPM) coupled via the tap coupler 11 to the transmission line 5 and adapted for monitoring at least one transmission parameter of the transmission line 5. The monitoring means 12 are connected with control means 13 for controlling at least one operation parameter of the corresponding Raman amplifier 6, e.g. a pump power of one or several of the Raman pumps 8.1 to 8.3, to achieve substantial gain flatness on the transmission line 5.

In order to communicate between the transmitting terminal 2 and any one of the plurality of optical amplifiers 4, e.g. for directly controlling the at least one operation parameter of the corresponding Raman amplifier 6 (see above), the present invention proposes a solution based on a low bit rate optical supervisory channel (OSC) located in the middle or at an extremity of the amplification/transmission bandwidth (cf. FIG. 2).

To this end, the transmission system depicted in FIG. 1 furthermore comprises optical receiving 14 and transmitting means 15 for communication of data between at least the transmitting terminal 2 and the optical amplifiers 4 on the optical supervisory channel. In the embodiment shown the transmitting means 15 take the form of a directly modulated laser operating at the OSC wavelength and coupled to the transmission line 5 by means of the tap coupler 11. The receiving means 14 comprise a filter means 16 inserted in front of a photodiode 17 to remove the traffic channels and select the supervisory channel, and to receive communication data transmitted on the OSC by the transmitting terminal 2 and/or other optical amplifiers downstream the optical amplifier 4, respectively. Both the OSC receiving means 14 and the OSC transmitting means 15 are connected with the control means 13 for alternatively controlling the at least one operation parameter of the corresponding Raman amplifier 6 and for adding communication data from a given amplifier 4 to the OSC (cf. FIGS. 4a,b below), respectively. In this way, each optical amplifier 4, i.e. each Raman amplifier 6 comprised therein, can be controlled either directly from the transmitting terminal 2 via the OSC by means of the receiving means 14 and the control unit 13 in accordance with data communicated by the transmitting terminal 2 to the optical amplifier 4, or the optical amplifiers 4 autocontrol themselves by means of the OPM 12 and the control means 13 as described above. In either case, the receiving means 16 and the OPM 12, respectively, produce an output signal suitable for inciting the control means 13 to control the operation parameter of the corresponding Raman amplifier 6. The control means 13 also control the transmitting means 15 with respect to the transmission of communication data on the OSC, which will be described in detail with reference to FIGS. 4a,b below.

Figure 1:
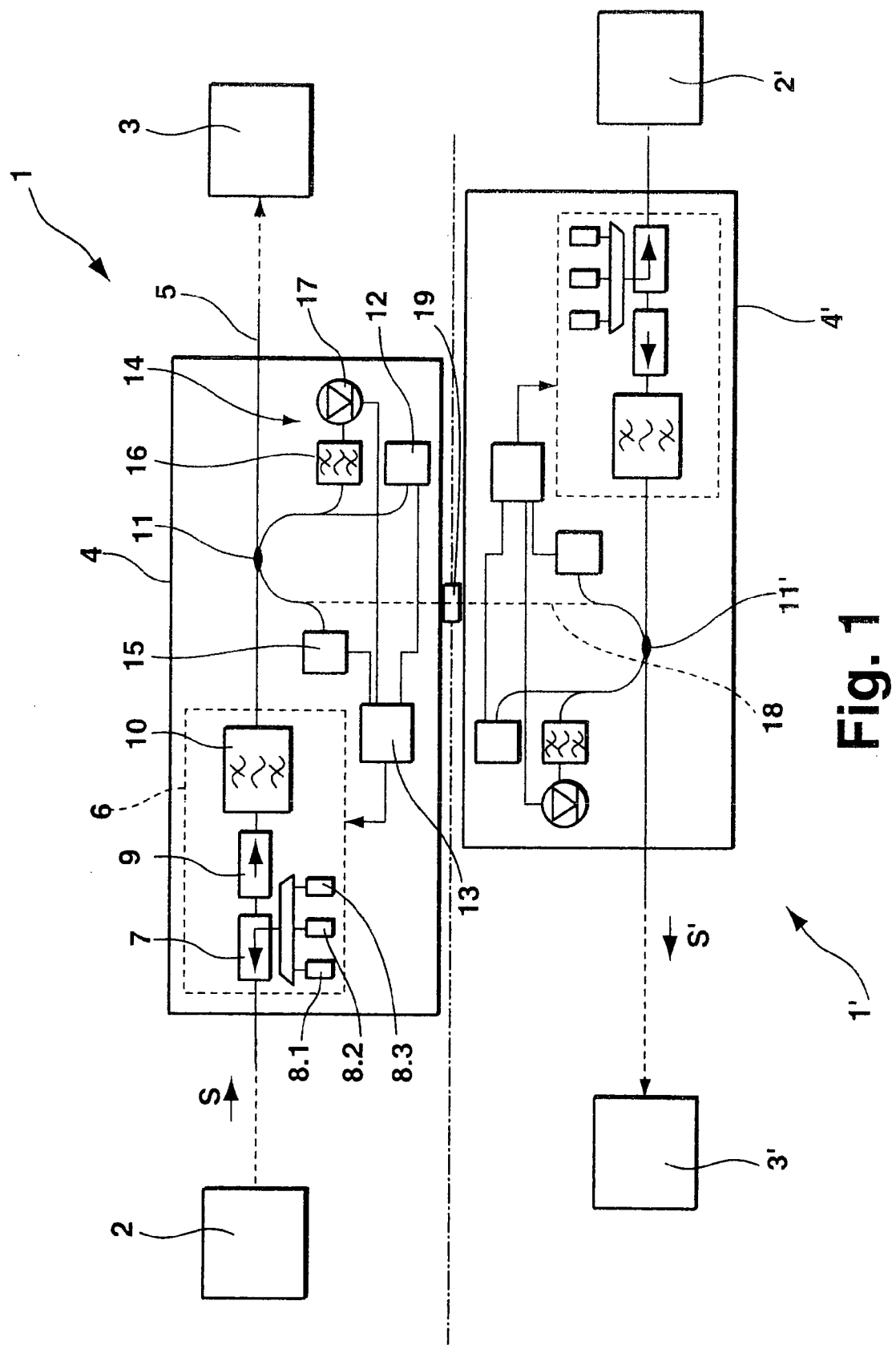
FIG. 1 is a schematic block diagram of an optical transmission system according to a first embodiment of the invention.

The overall structure of the inventive all-Raman transmission system 1 is simpler than for currently known EDFA systems, as only one tap coupler 11 on the transmission line 5 has to be used instead of two for each optical amplifier 4. This is due to the fact that the signal S does not have to be amplified by an lumped (EDFA) amplifier since it has already been amplified by distributed Raman amplification performed on the transmission line 5 upstream the optical amplifier 4. On the contrary, in prior art (terrestrial) transmission systems a demultiplexer is located upstream and a corresponding multiplexer is located downstream each amplifier to extract the supervisory wavelength (modulation at very low bit rate, 2 Mbit/s or slightly more). The proposed solution, which uses only one tap coupler 11 to extract data from the supervisory channel and to add information thereto, thus significantly reduces the number of optical multiplexers and demultiplexers along the transmission line while improving the system performance (reduction of loss, noise, PMD, and PDL).

In a transatlantic transmission system, for instance, the inventive system 1 described above can be identified with a West-East cable. As indicated by the dotted vertical line in FIG. 1, a link 18 between the West-East cable and an identical East-West cable, i.e. an identical optical transmission system 1' for transmitting optical signals S' in an opposite direction between a transmitting terminal 2' and a receiving terminal 3', is provided in order to perform bi-directional transmission and to ensure functioning of the combined system 1, 1' in case of a cable cut. The identical optical transmission system 1' is depicted below the dash-dotted horizontal line in FIG. 1. As it corresponds to the system 1 described above, it will not be described in detail here. The link 18 is realised between the single tap coupler 11 of the optical amplifier 4 of the West-East cable and a corresponding single tap coupler 11' of the optical amplifier 4' of the East-West cable. An attenuator 19 is added in the link 18 between the two tap couplers 11, 11' in order to minimise detrimental interaction between the two cables. The transmitting terminal 2 of the West-East cable and the receiving terminal 3' of the East-West cable as well as the receiving terminal 3 of the West-East cable and the transmitting terminal 2' of the East-West cable can be connected in the form of a respective end terminal (not shown). By this means, information from the individual optical receivers 4 can be sent back to the transmitting terminal 2 by using the other way of the cable, i.e. the other transmission system 1', which can be useful in case of failure, e.g. a cable cut. Obviously, the same holds for the other transmission system 1', which may rely on the transmission system 1 in case of failure.

Figure 2:
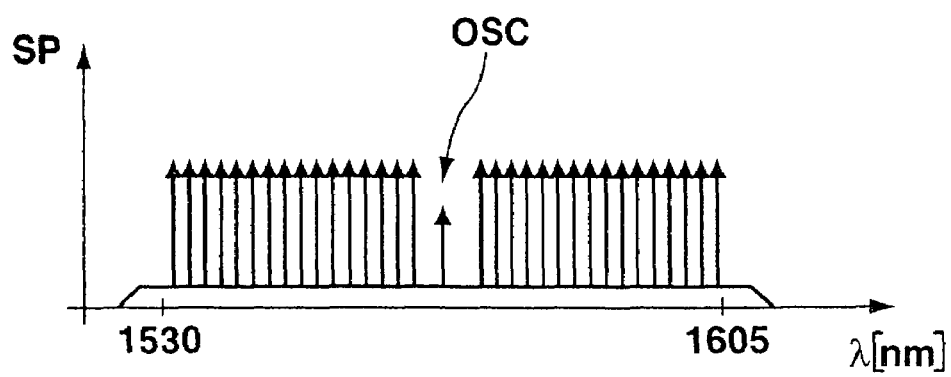
FIG. 2 is a spectral diagram of the amplification band showing the location of the optical supervisory channel.

FIG. 2 shows a possible location of the optical supervisory channel OSC in the middle ($\lambda \approx 1565$ nm) of the amplification/transmission bandwidth ranging from about 1530 nm to about 1605 nm. A signal power SP used on the OSC is symbolised by the thick vertical arrow. The thin vertical arrows right and left of the OSC symbolise the transmission channels of the inventive transmission system 1, 1' (FIG. 1) in view of the associated wavelength and signal power, respectively. According to the invention, as the bit rate of the optical supervisory channel is chosen to be much lower than the bit rate of the transmission channels (10 Gb/s or higher), the OSC channel power can also be much lower.

Figure 3A:
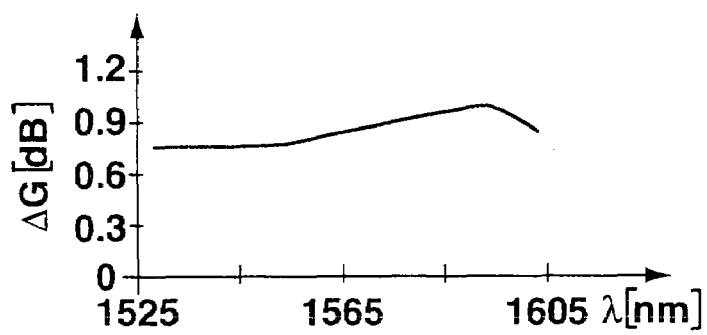
FIG. 3a,b are spectral diagrams showing a variation of gain shape and signal power downstream one transmission span as a function of input power and fiber loss changes, respectively.
Figure 3B:
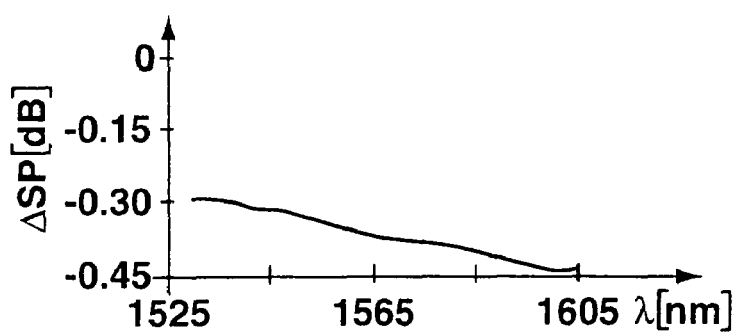
Figure 4A:
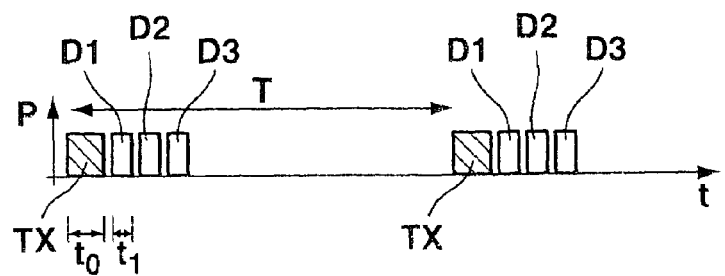
FIG. 4a,b are diagrams showing timeshared data communication on the optical supervisory channel as a function of amplifier position.
Figure 4B:
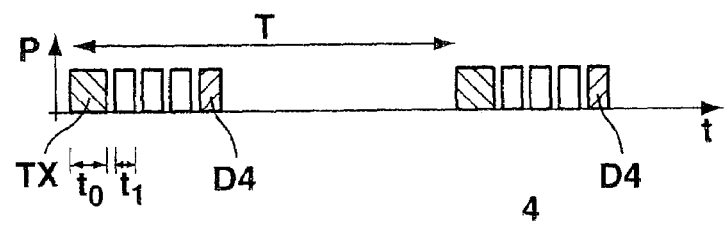
Figure 5:
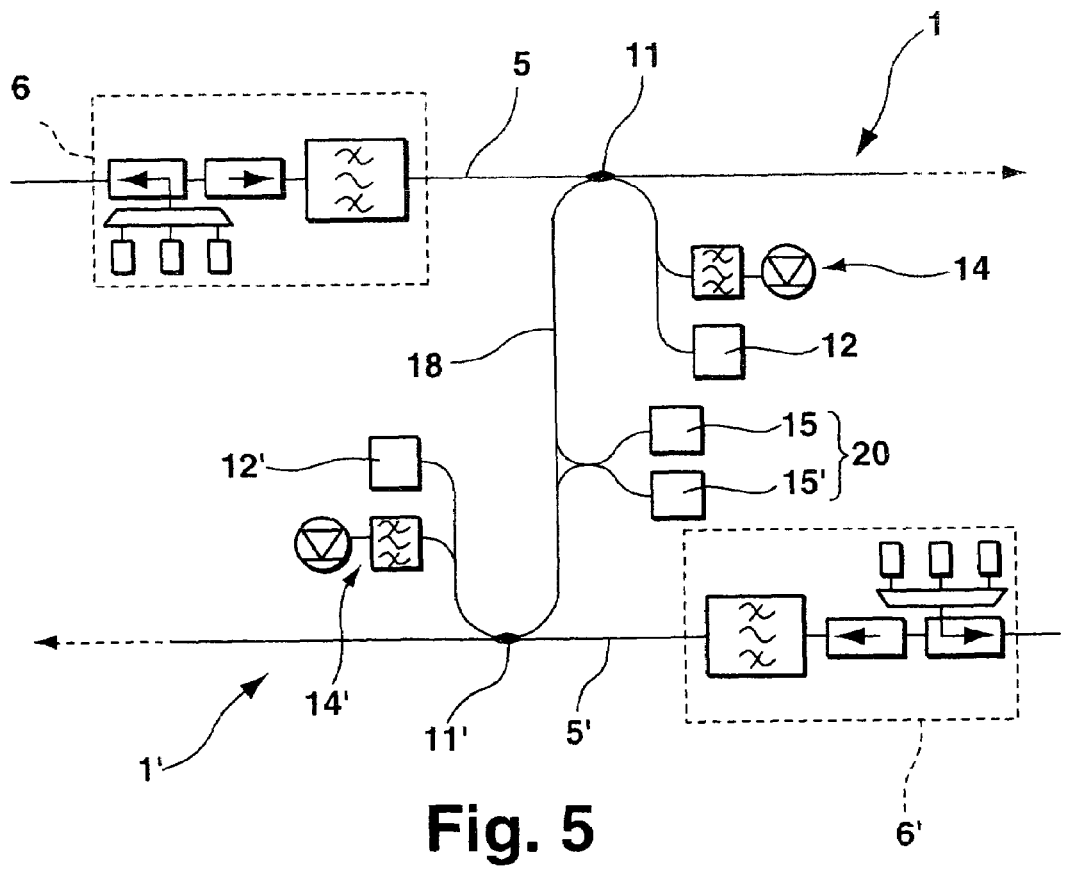
FIG. 5 is a schematic block diagram of an optical transmission system according to a second embodiment of the invention.

In the proposed (submarine) wide band all-Raman transmission system, a variation of fiber loss due to ageing leads to a large gain (and tilt) variation which has to be compensated by Raman pump power re-optimisation as explained in detail with reference to FIG. 1 above: FIG. 3a shows a variation ΔG of the transmission line gain shape for an exemplary 4 dB change of input power upstream one of the optical amplifiers 4 (cf. FIG. 1). FIG. 3b shows a variation of signal power ASP after one span of transmission line for a variation of fiber loss by 0.003 dB/km. It illustrates the fact that a tilt variation is also generated when the input power upstream an amplifier drops due to a fiber repair or the like. FIGS. 3a,b also explain why in an all-Raman system as proposed by the present invention, the number of parameters to be optimised during the life time of the system is much higher than for prior art EDFA based systems (as all pump currents of the Raman amplifiers have to be precisely adjusted and not only the value of a few "tilters" along the line as in EDFA systems), thus advantageously making use of an optical supervisory channel for data communication between the terminals and the optical amplifiers. FIGS. 4a, b show details of the data communication between the transmitting terminal 2, 2' (FIG. 1) and the optical amplfiers 4, 4' in the inventive optical transmission system 1, 1'. The transmitting terminal first sends some data TX with signal power P during a time $t_0$, e.g. command data for changing an operation parameter of an optical amplifier 4, 4'. Then each amplifier can answer or give his own information by adding corresponding data D1, D2, D3, D4 (e.g., pump power, spectrum shape, etc.) during a time $t_1$ ($t_1 < t_0$) owing to the transmitting means 15 located in the amplifier (e.g., a directly modulated laser at the OSC wavelength λ=1565 nm; cf. FIG. 1). In the designation used here, reference numerals Di, i=1, . . . , n, stand for data sent on the OSC by the corresponding i-th optical amplifier, where n denotes the total number of amplifiers present on the transmission line. After a time T corresponding to a period of the timeshared communication has elapsed the terminal again sends data TX during a time $t_0$. As can be gathered from FIGS. 4a,b the individual data transmission TX, Di are separated by short time slots without any transmission, therefore $t_0 + \Sigma_i t_{1i} \leq T$. FIG. 4a specifically shows an OSC data input at the fourth optical amplifier in a transmission system according to the invention. Within the period T the amplifier in question receives data from the terminal (TX) followed by data D1-D3 subsequently added to the OSC by the first, second, and third amplifiers, respectively, located upstream its own position. FIG. 4b shows the corresponding OSC data output at the fourth optical amplifier, with data D4 from the fourth amplifier having been added for communication to the amplifiers located downstream and/or the terminal (in particular in case of failure, see above). Thus each amplifier can read all the information written by the terminal and the previous amplifiers as the information on the supervisory wavelength are localised in time as a function of the amplifier position in the system. As time is shared between the amplifiers for to write their own information, no additional optical components such as optical demultiplexers have to be inserted in the link. In this way, the last data added to the OSC may also be used as an indicator with respect to the location of a fault in the system, e.g. a cable cut. FIG. 5 shows an alternative embodiment of the optical transmission system according to the invention. As in FIG. 1 two identical transmission systems 1, 1' are coupled by means of a link 18 arranged between two single tap couplers 11, 11'. For simplicity of illustration, only one Raman amplifier 6, 6' of each system 1, 1' is depicted together with the associated monitoring, receiving, and transmitting means 12, 12'; 14, 14'; and 15, 15', respectively. In particular, the transmitting and receiving terminals as well as the control means have been left out (cf. FIG. 1). In order to achieve a system redundancy improvement with respect to the reliability of the inventive transmission system, the laser transmitting means 15, 15' form a shared optical supervisory channel transmitting means 20 for shared use in both of the linked systems 1, 1'. By this means, the same information is sent into both directions by one laser 20, i.e. one of the transmitting means 15, 15'. If a laser failure occurs during system life, a second one can replace it, i.e. the other one of the transmitting means 15, 15'. Obviously, more than two transmitting means could be provided in the shared optical supervisory channel transmitting means 20.

Additionally, in linked systems 1, 1' the command data (FIG. 4a,b) for each amplifier can be sent by either the West terminal or the East terminal in order to further improve system reliability (e.g. in case of one photodiode in the OSC receiving means 14, 14' (FIG. 1, 5) being degraded).

In this way, the proposed individual and linked optical transmission systems according to the present invention show improved performance, in particular with respect to loss, noise, PMD, and PDL, while distinguishing themselves from prior art systems by their simplicity of realisation and the corresponding cost effectiveness.

The invention claimed is:

1. An optical wavelength division multiplex transmission system for transmitting optical signals on a plurality of wavelength channels, said system having a transmitting terminal and a receiving terminal interconnected by a transmission line with at least one, optical amplifier, each of optical amplifier comprising:
    a Raman amplifier with at least one pump light source for pumping the transmission line upstream of the optical amplifier,
    a controller controlling at least one operation parameter of the Raman amplifier,
    a single tap coupler arranged downstream of the Raman amplifier, and
    an optical receiver and transmitter connected to the transmission line for communication of data between at least the transmitting terminal and the optical amplifiers on an optical supervisory channel, at least said optical receiver being operatively connected with the controller to control the at least one parameter of the Raman amplifier in accordance with said data,
    wherein
    said optical receiver and said optical transmitter are connected to the transmission line by means of the single tap coupler.

2. A transmission system according to claim 1, wherein each optical amplifier is coupled by means of its tap coupler to a corresponding optical amplifier of a second substantially identical transmission system for transmitting optical signals in an opposite direction via a transmission line of the second system.

3. A transmission system according to claim 1, wherein each optical amplifier comprises monitoring means for monitoring at least one optical transmission parameter, the monitoring means being connected to the transmission line by means of the single tap coupler.

4. A transmission system according to claim 3, wherein the monitoring means are connected to the controller for controlling the at least one operation parameter, of the Raman amplifier.

5. A transmission system according to claim 1, wherein the optical supervisory channel is configured as a channel with a given wavelength.

6. A transmission system according to claim 2, wherein both transmission systems have a single shared optical supervisory channel and the transmitting means is arranged for transmitting optical supervisory channel communication data simultaneously in both directions.

7. A transmission system according to claim 5, wherein a bit rate in the optical supervisory channel is lower than a bit rate on any one of the other wavelength channels.

8. A transmission system according to claim 5, wherein the optical supervisory channel is located in the amplification bandwidth of the optical amplifiers, preferably in the middle or at an extremity thereof.

9. A transmission system according to claim 5, wherein the optical transmitter comprises a directly modulated laser operating at the wavelength of the optical supervisory channel.

10. A transmission system according to claim 1, wherein the optical receiver comprises a filter for removing the transmission channels and selecting the optical supervisory channel as well as a light sensitive receiving element, e.g. a photodiode, arranged behind the filter.

11. A transmission system according to claim 1, wherein the optical supervisory channel is arranged for timeshared communication of data, the transmitting terminal being arranged for transmitting data (TX) during a time $t_0$ and the optical amplifiers being arranged for transmitting data during subsequent times $t_{1i}$, $i=1, \ldots, n$, specific to each amplifier, where i is an optical amplifier index incremented in the direction of signal transmission and n is the total number of optical amplifiers in the transmission system, with $t_0 = \Sigma_i t_{1i} \leq T$, where T is a period of the timeshared communication.

12. A transmission system according to claim 1, wherein an optical supervisory channel input signal at a given optical amplifier comprises at least one datum originating from the transmitting terminal followed by data originating from any one of the optical amplifiers located upstream of the given optical amplifier, and wherein an optical supervisory channel output signal at a given optical amplifier comprises at least one datum originating from the transmitting terminal followed by data originating from any one of the optical amplifiers located upstream the given optical amplifier and a datum originating from the given optical amplifier.

* * * * *